United States Patent
van Beek et al.

(10) Patent No.: US 6,340,101 B1
(45) Date of Patent: Jan. 22, 2002

(54) PROCESS AND DEVICE FOR DISPENSING A POWDERY PRODUCT

(75) Inventors: Maurice Adrianus Wilhelmus van Beek; Cornelis M Beijersbergen van Henegouwen; Lucas Alphonsus Maria Evers; Reni Louis Jean Lahaye; Marc van Megen; Peter Joost Wieriks, all of Zeist (NL)

(73) Assignee: Unilever Patent Holdings BV, Vlaardingen (NL)

( * ) Notice: Subject to any disclaimer, the term of this patent is extended or adjusted under 35 U.S.C. 154(b) by 0 days.

(21) Appl. No.: 09/522,036

(22) Filed: Mar. 9, 2000

(30) Foreign Application Priority Data

Mar. 9, 1999 (NL) .............................................. 1011502

(51) Int. Cl.$^7$ ............................................. A45D 24/22
(52) U.S. Cl. ........................ 222/203; 222/162; 222/217; 222/359; 222/363
(58) Field of Search ................................ 222/246, 247, 222/248, 167, 363, 359, 217, 202, 203, 162

(56) References Cited

U.S. PATENT DOCUMENTS

| | | | | |
|---|---|---|---|---|
| 2,720,341 A | * | 10/1955 | Stirn et al. ................... | 222/202 |
| 2,900,109 A | * | 8/1959 | Hoopes et al. ................. | 222/1 |
| 3,391,833 A | * | 7/1968 | Plura .......................... | 222/200 |
| 3,445,040 A | * | 5/1969 | Katz .......................... | 222/108 |
| 3,841,530 A | * | 10/1974 | Janninck ...................... | 222/189 |
| 4,053,087 A | * | 10/1977 | Lack et al. ................... | 222/278 |
| 5,697,523 A | * | 12/1997 | Brandauer ..................... | 222/58 |
| 5,725,131 A | * | 3/1998 | Bell et al. ................... | 222/196 |
| 5,975,366 A | * | 11/1999 | Ridgley ....................... | 222/132 |
| 6,145,705 A | * | 11/2000 | Wallace et al. ............... | 222/162 |

FOREIGN PATENT DOCUMENTS

| | | |
|---|---|---|
| EP | 0 134 095 | 3/1985 |
| EP | 0 785 151 A1 | 7/1997 |
| GB | 678872 | 9/1952 |
| GB | 739029 | 10/1955 |
| GB | 901388 | 7/1962 |
| GB | 2 137 159 A | 10/1984 |
| GB | 2 150 117 A | 6/1985 |

* cited by examiner

Primary Examiner—Joseph A. Kaufman
Assistant Examiner—Melvin A. Cartagena
(74) Attorney, Agent, or Firm—Pillsbury Winthrop LLP

(57) ABSTRACT

In a process for dispensing a powdery product (P) from a container (1) with a dispensing nozzle (4) aimed downwards, a flexible section (3) of the container (1) is deformed at least near the dispensing nozzle (3). This is achieved preferably by a movement of the container relative to the dispensing nozzle, in a direction with a component at a right angle to the dispensing nozzle. The movement of the container (1) and the dispensing of a portion of product from the dispensing nozzle (4) can take place immediately after one another. The invention also comprises a device for dispensing a powdery product (P), with which the process can be carried out and bridge and tunnel formation in the powdery product is opposed effectively.

11 Claims, 3 Drawing Sheets

PROCESS AND DEVICE FOR DISPENSING A POWDERY PRODUCT

Figure 1:
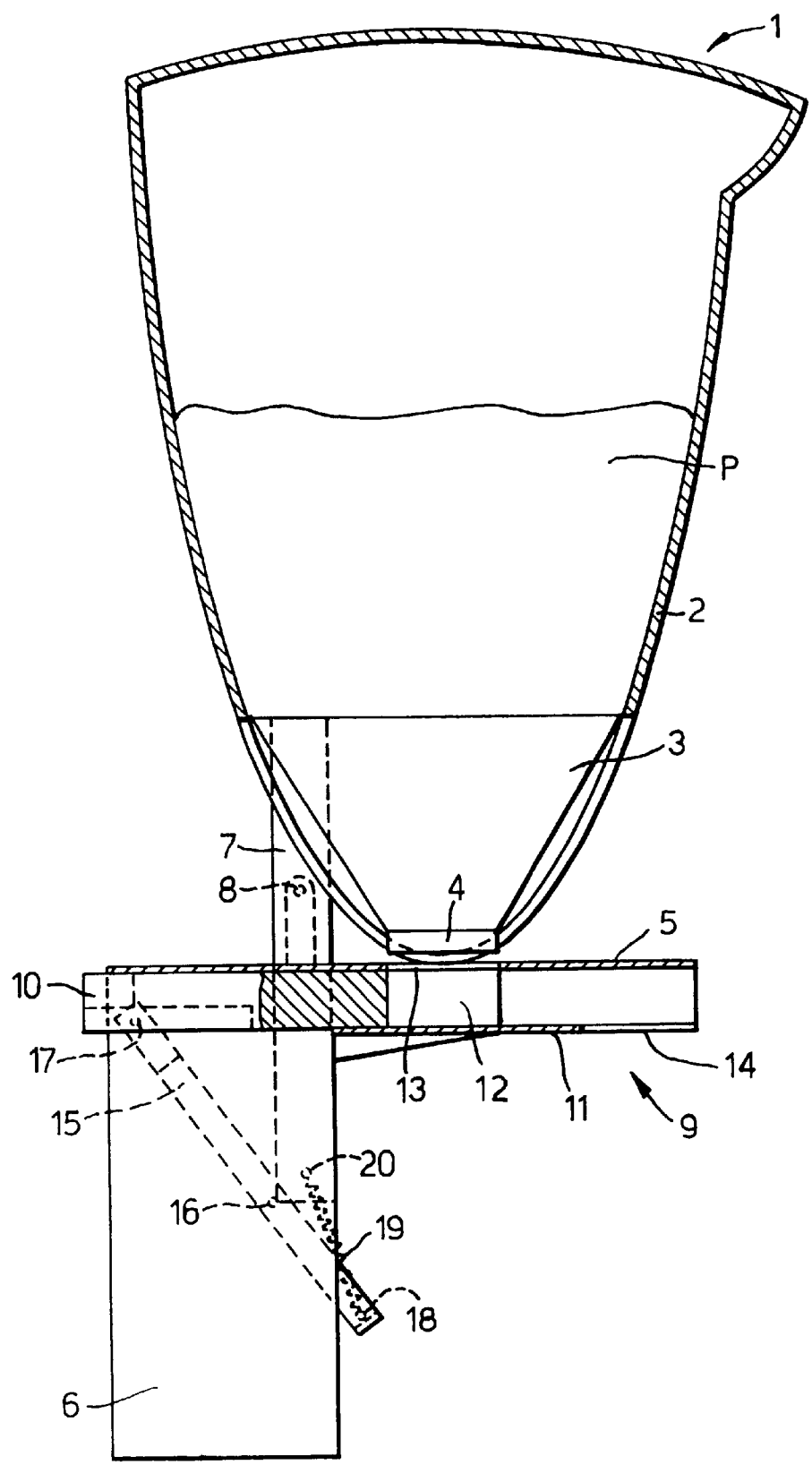

The invention relates to a process for dispensing a powdery product from a container with a dispensing nozzle aimed downwards, as well as to a device which can be used for this process.

Processes and devices for dispensing a powdery product are known in many embodiments. A problem when dispensing a powdery product from a container, where the product must flow from the dispensing nozzle under the effect of gravity, resides in the so-called bridge and tunnel formation due to caking in the product. This obstructs or prevents the powdery product from flowing out. Solutions to this problem can be found in JP-A-8313329, DE-A 43 29 356, U.S. Pat. No. 4,541,765 and FR-A-2 479 704. In all these publications there is question of a bag-shaped (inner) container which at the topside is suspended or supported in a movable way, where the movement at the topside of the bag-shaped (inner) container is supposed to prevent or remove the bridge and tunnel formation. All these publications relate mainly to larger containers for bulk applications.

The present invention now intends to provide a process and device for dispensing a powdery product which are very effective in the prevention of bridge or tunnel formation and which are also suitable for use with smaller containers.

To this end the process according to the invention is characterised in that a flexible part of the container is deformed at least near the dispensing nozzle, preferably by means of movement in a direction with a component at a right angle to the dispensing nozzle. By deforming a flexible part of the container at least near the dispensing nozzle, the problem is attacked at the root, i.e. a deformation is caused at the location where the bridge or tunnel formation occurs, so that this bridge or tunnel is disturbed due to deformation of the adjacent part of the container. The container is preferably moved relative to the dispensing nozzle and such a movement can be achieved easily, for instance by tilting the container around a tilting shaft which is approximately horizontal.

If the movement of the container and the dispensing of a measured quantity of product from the dispensing nozzle are carried out each time immediately after one another, the bridge or tunnel formation will be avoided entirely. In the event that the container is equipped with a dispensing device, it is advantageous to let this dispensing device work by shocks. The effects of these shocks will also be felt in the container and in the powdery product contained therein, which also contributes to the prevention, or removal, of tunnel or bridge formation.

The device according to the invention which can be used with the process described above is characterised to that end in that the container is provided with a movable part at least near the dispensing nozzle, which is preferably mobile in a direction with a component at a right angle to the dispensing nozzle.

It is advantageous if the container is provided with flexible bellows adjacent to the dispensing nozzle, which bellows preferably become wider in the upward direction from the dispensing nozzle towards an essentially rigid part of the container.

By making deformable only the part of the container which is adjacent to the dispensing nozzle, the deformation caused by a movement of the container is concentrated in the area near the dispensing nozzle, so that the movement of the container is used with optimal effectiveness for the deformation, respectively disturbance, of the bridge or tunnel formation. The container can be supported in a movable, and preferably tilting, way by a support around a horizontal shaft.

In the event that the device is provided with a dispensing device for dispensing predetermined portions of the product, it is preferable to connect the dispensing device with the container by means of a transmission mechanism for converting the movement of the container into a movement of the dispensing device.

In this way a single transmission, which can also be realised manually, can achieve a double action, namely the successive deformation of the container and the activation of the dispensing device.

It is then advantageous if the transmission mechanism is equipped with a tensioning mechanism with a spring, in particular a tension spring, which is tensioned by the movement of the container and of which the tension force can be released for carrying out a movement of the movable part of the dispensing device from a filling position, in which the dispensing cavity is in line with the dispensing nozzle, to a dispensing position in which the dispensing cavity can be emptied.

In this embodiment the dispensing device is driven by the spring which is tensioned by the movement of the holder. Especially when the energy of the spring is released abruptly and therefore the movable part of the dispensing device is moved from a filling position to a dispensing position, the movable part will reach the dispensing position at a high speed and if this movement is not absorbed, the stopping of the movable part will result in a shock in the container, which contributes to the prevention, respectively removal, of the bridge formation, as already indicated above.

The process and device according to the invention are suitable in particular for being used for dispensing small portions of a powdery product, especially dispensing powder for preparing drinks, such as soup powder, coffee powder and the like.

The invention will be explained in greater detail below by means of the drawings which very schematically represent an embodiment of the device according to the invention.

Figure 2:
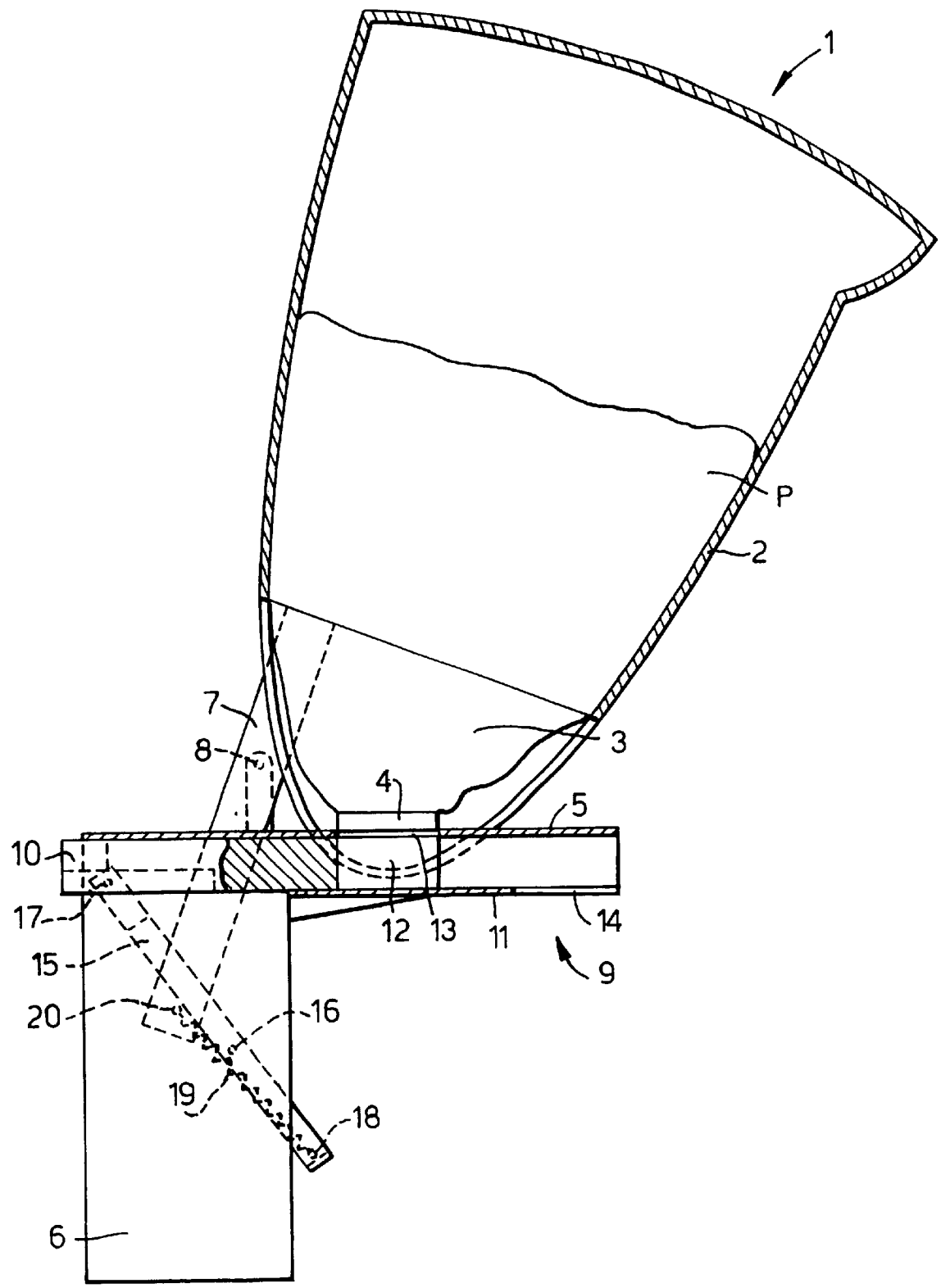
Figure 3:
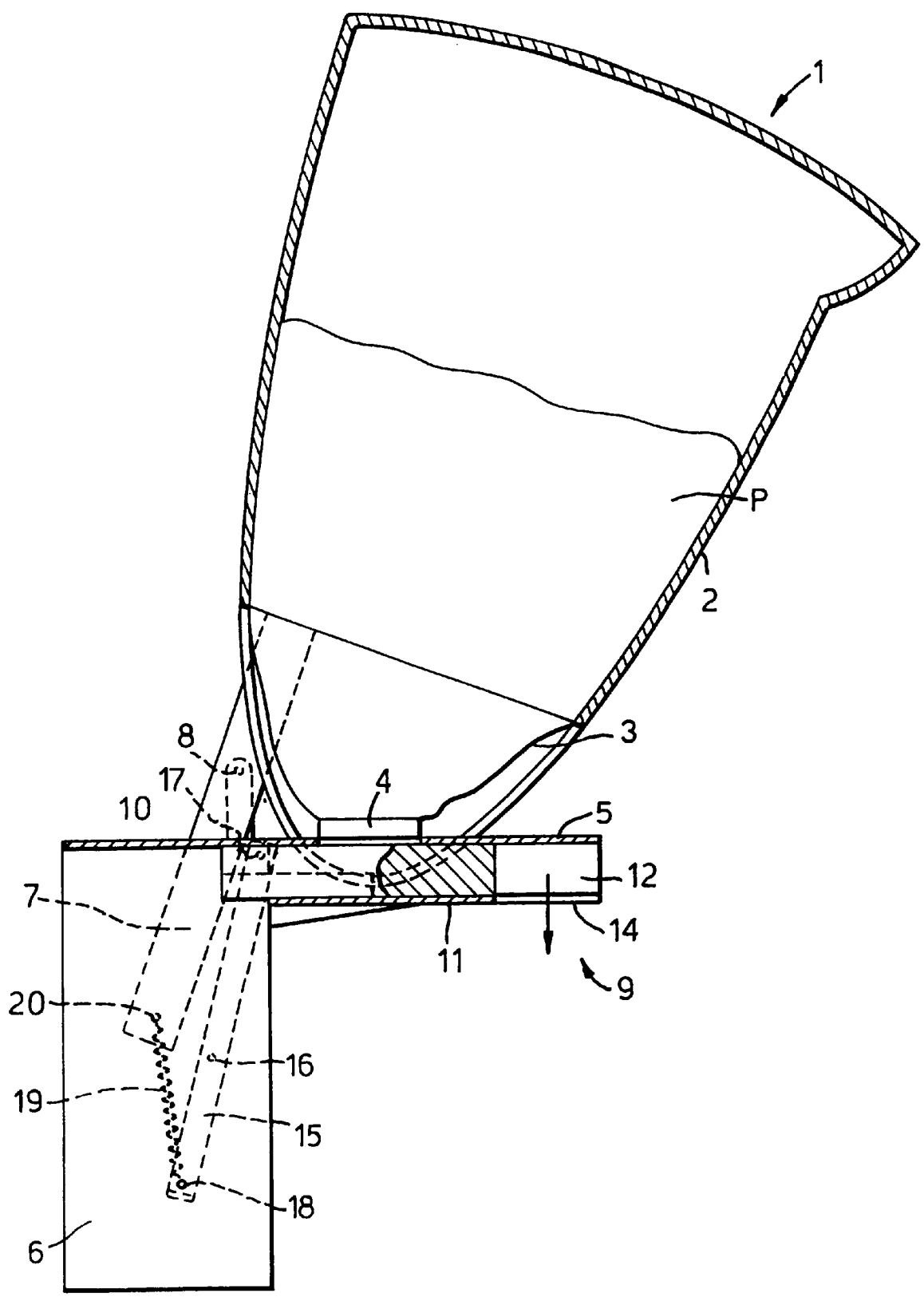

FIGS. 1 to 3 are vertical cross sections of the embodiment of the device for dispensing a powdery product according to the invention, in three different positions to illustrate the working principle.

The drawings show the embodiment of the device for dispensing a powdery product, in this case dry soup powder which must be dispensed in portions to make a cup of soup. Obviously, all sorts of other applications are conceivable as well.

The device is provided with a container 1 for receiving a quantity of powder P which must be dispensed in portions. The container consists of an upper rigid section 2 and, connecting thereto, lower flexible bellows 2 which at the underside end at a downward dispensing rigid dispensing nozzle 4. The flexible bellows 3 widen upward from the dispensing nozzle 4 in a funnel-shape towards the rigid section 2 of the holder. The rigid dispensing nozzle 4 is fastened to a stationary plate 5 which is connected with a stationary support 6 for the device for the device which, in a way not shown in detail, is fastened to or is supported by a surface. The rigid section 2 of the container 1 is supported via an arm 7 by a horizontal tilting shaft 8 of the support 6, so that the rigid section 2 of the container 1 can perform a tilting movement around the tilting shaft 8. The tilting shaft 8 is located horizontally and vertically at some distance from the dispensing nozzle 4.

The device shown is also provided with a dispensing device 9, which in that case acts as a dispensing slide 10, but which might also function in accordance with all sorts of other principles, for instance with a chamber or revolving dispensing system.

The dispensing slide 10 is guided in a sliding manner between the plate 5 and a plate 11 under this plate, and is provided with a dispensing chamber or cavity 12 which continues in the upward direction and of which the volume corresponds with the portion of powder to be dispensed. The dispensing slide 11 is movable between a filling position (see FIG. 1) in which the dispensing cavity 12 is in line with the dispensing nozzle 4 of the container 1 and with a passage hole 13 in the plate 5, and a dispensing position in which the dispensing cavity 12 is in line with a passage hole 14 in the bottom plate 11.

The dispensing device 9 is provided with a transmission mechanism which in this case consists of a transmission mechanism between the arm 7 of the container 1 and the dispensing slide 10. This transmission mechanism comprises a lever 15 which can swivel around a horizontal swivelling shaft 16 on the support 6. At one extremity near 17 the lever which is hinged and slidable, in the vertical direction, is connected with the dispensing slide 10, whereas the opposite extremity is connected at 18 with a spring, in this case a tension spring 19 which at its other extremity at 20 is connected with the arm 7 of the container 1.

The transmission mechanism between the container 1 and the dispensing slide 10 and the various components thereof are positioned and dimensioned in such a way that the movement of the container 1 serves for tensioning the tension spring 19 and the subsequent release of the tension force for driving the dispensing slide 10 in the manner to be described below.

The principle of the embodiment is as follows. FIG. 1 shows the device in the idle position in which the container 1 is upright and the dispensing slide 10 is in the filling position, which means that the dispensing cavity 12 is located under the dispensing nozzle 4 of the container 1, so that the dispensing cavity 12 can be filled with the powder P from the container 1.

The tension spring 19 is in this case slightly tensioned already, whereas the direction of the spring and thus the direction of the tension force in the spring is such that the spring 19 on the lever 15 exercises a torque around the tilting shaft 16 which keeps the dispensing slide 10 in the filling position. The direction of the tension spring 19 is determined in this position by the position of the two extremities 18 and 20 of the spring 19 on the lever 15, respectively the arm 7. The tension force of the tension spring 19 exercises furthermore on the arm 7 a torque around the tilting shaft 8, which opposes a tilting of the container. FIG. 1 therefore represents a stable starting position of the device. FIG. 2 shows that the container 1 has tilted around the shaft 8. In the embodiment shown the container can simply be titled manually, but obviously an electrical or other transmission device might have been installed as well for achieving the movement of the container 1. Due to the tilting of the container 1, during which the dispensing nozzle 4 remains in its position, the bellows 3 between the dispensing nozzle 4 and the rigid section 2 of the container 1 will be deformed. This deformation is the result of a rotation of the rigid section 2 of the container relative to the dispensing nozzle 4, as well as of a lateral and downward movement of the rigid section 2 of the container 1. The ratio between the various movements depends on the position of the tilting shaft relative to the dispensing nozzle 4. The deformation of the bellows 3 assures that the powder P contained in the bellows 3 is put into motion and the coherence between the powder particles is disrupted, so that the caking is removed and the powder will move optimally downwards under the force of gravity and a bridge or tunnel will therefore be removed, respectively prevented. In this way the dispensing cavity of the dispensing slide 10 will be filled optimally.

The tilting of the container 1 assures that the lower extremity of the arm 7 is moved relative to the lever 15, respectively the tilting shaft 16 and the lower extremity 18 thereof. First of all the distance between the origins of force 18 and 20 of the tension spring 19 is enlarged, so that the tension spring 19 is tensioned. Furthermore the origin of force 20 travels in the direction of a line through the origin of force 18 of the lever 15 and the tilting shaft 16. As long as the origin of force 20 remains at the same side of the line, the torque of the tension spring 19 on the lever 15 will continue to act in the same direction, so that the dispensing slide 10 remains in its position. FIG. 2, however, shows that at a certain moment, near the end of the tilting movement of the container, the origin of force 20 of the tension spring 19 intersects the above-mentioned line through the origin of force 18 and the tilting shaft 16, so that the torque on the lever 15 changes its direction. This causes the lever 15 to be loaded in such a way that it wants to move the dispensing slide 10 from the filling position to the dispensing position.

In FIG. 3 the dispensing slide has indeed been moved by the lever 15 to the dispensing position, in which the dispensing cavity 12 has come to be aligned with the passage opening 14, and therefore the powder can fall down from the dispensing cavity 12, for instance into a waiting cup. As the torque on the lever 15 abruptly changes direction and the complete tension force of the spring 19 is released onto the lever 15 and the dispensing slide 10, the dispensing slide 10 will move to the dispensing position at great speed. If a fixed cam without absorption is now used to stop the dispensing slide 10 in the dispensing position, the dispensing slide will come to a standstill with a blow, so that, first of all, all powder will fall from the dispensing cavity 12, whereas furthermore the resulting shock will be passed on to the container 1. This also opposes bridge and tunnel formation in the powder P in the container 1.

If the container 1 is moved back from this position, the origin of force 20 of the tension spring 19 will intersect the line through the origin of force 18 and the tilting shaft 16 of the lever and therefore cause the torque on the lever 15 to change direction again, which results in the return movement of the dispensing slide 10 by means of the tension spring 19. The device then returns to the starting position according to FIG. 1.

It will be obvious from the above that the invention provides a process and device for dispensing portions of a powdery product, which on the one hand are simple and on the other hand achieve a reliable and accurate dispensing of portions and oppose bridge and tunnel formation of the powder in the container 1.

The invention is not limited to the example of an embodiment as shown in the drawing and described above, which embodiment can be varied in various ways within the framework of the invention. It is possible for instance to move the container adjacent to the dispensing nozzle in another way than by deformation. By powdery products are also understood granular products and the like, where the same effect occurs.

What is claimed is:

1. Process for dispensing a powdery product (P) from a container (1) with a dispensing nozzle (4) aimed downwards, which comprises moving the container relative to the dispensing nozzle and deforming a flexible section (3)

of the container (1) at least near the dispensing nozzle (4), by means of movement in a direction with a component at a right angle to the dispensing nozzle whereby bridge or tunnel formation of the powdery product at the nozzle is avoided by deformation of said flexible section.

2. Process according to claim 1 where the container (1) is moved relative to the dispensing nozzle (4).

3. Process according to claim 1, where the movement of the container (1) and the dispensing of a portion of product from the dispensing nozzle (4) are carried out immediately after one another.

4. Device for dispensing a powder product (P), provided with a container (1) with a dispensing nozzle (4) aimed downwards, characterised in that the container (1) is supported in a movable way around a horizontal shaft (8) by support (6) and is provided with a movable part (3) at least near the dispensing nozzle (4) which is movable in a direction with a component at a right angle to the dispensing nozzle (4) whereby bridge or tunnel formation of the powdery product at the nozzle is avoided by deformation of said flexible section.

5. Device according to claim 4, where the container (1) is provided with flexible bellows (3) adjacent to the dispensing nozzle (4), which preferably widen upwards from the dispensing nozzle towards an essentially rigid section (2) of the container (1).

6. Device according to claim 4, where the container (1) can be moved by hand.

7. Device for dispensing a powder product (P), provided with a container (1) with a dispensing nozzle (4) aimed downwards, characterised in that the container (1) is provided with a movable part (3) at least near the dispensing nozzle (4) which is movable in a direction with a component at a right angle to the dispensing nozzle (4) whereby bridge or tunnel formation of the powdery product at the nozzle is avoided by deformation of said flexible section, said container (1) being supported in a movable way around a horizontal shaft (8), by a support (6), provided with a dispensing device (9) for dispensing predetermined portions of the product (P), where the dispensing device is preferably connected with the container (1) by means of a transmission mechanism (15–20) for converting the movement of the container (1) into a movement of the dispensing device (9).

8. Device according to claim 4 or claim 7, where the container (1) is supported in a movable, tilting way around a horizontal shaft (8), by a support (6).

9. Device according to claim 7, where the dispensing device (9) is provided with dispensing slide 10 with a dispensing cavity (12), which slide 10 can travel to and fro by means of the transmission mechanism (15–20) between the container (1) and the dispensing slide (10).

10. Device according to claim 9, where the transmission mechanism (15–20) is realised with a tension mechanism with a spring, in particular a tension spring (19), which is tensioned by the movement of the container (1) and of which the tension force can be released by the transmission mechanism for performing a movement of the dispensing slide (10) from a filling position in which the dispensing cavity (12) is aligned with the dispensing nozzle (4), to a dispensing position in which the dispensing cavity (12) can be emptied.

11. In a method for dispensing small portions of powdery product using a dispenser which comprises a container with a dispensing nozzle aimed downwards, the improvement whereby undesired bridging or tunnel formation of the powdery product is avoided, said improvement comprising utilizing, as the dispenser, the device of claim 4.

\* \* \* \* \*